United States Patent
Hua

(10) Patent No.: US 9,457,685 B2
(45) Date of Patent: Oct. 4, 2016

(54) INDUSTRIAL VEHICLE, SYSTEM FOR MANAGING OPERATION OF INDUSTRIAL VEHICLE, AND ELECTRIC FORKLIFT

(71) Applicant: Komatsu Ltd., Tokyo (JP)

(72) Inventor: Feng Hua, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 184 days.

(21) Appl. No.: 14/126,566

(22) PCT Filed: Feb. 20, 2013

(86) PCT No.: PCT/JP2013/054238
§ 371 (c)(1),
(2) Date: Dec. 16, 2013

(87) PCT Pub. No.: WO2014/128871
PCT Pub. Date: Aug. 28, 2014

(65) Prior Publication Data
US 2015/0197161 A1  Jul. 16, 2015

(51) Int. Cl.
| | |
|---|---|
| *B60L 11/18* | (2006.01) |
| *G07C 5/00* | (2006.01) |
| *G07C 5/08* | (2006.01) |
| *B66F 9/075* | (2006.01) |

(Continued)

(52) U.S. Cl.
CPC ............ *B60L 11/1861* (2013.01); *B60L 1/003* (2013.01); *B60L 11/1877* (2013.01); *B66F 9/075* (2013.01); *B66F 9/24* (2013.01); *G07C 5/008* (2013.01); *G07C 5/08* (2013.01); *B60L 2200/42* (2013.01); *B60L 2240/622* (2013.01); *B60L 2240/70* (2013.01); *B60L 2240/80* (2013.01); *B60L 2250/20* (2013.01); *Y02T 10/7005* (2013.01); *Y02T 10/705* (2013.01); *Y02T 10/7044* (2013.01); *Y02T 10/7291* (2013.01); *Y02T 90/16* (2013.01); *Y02T 90/162* (2013.01)

(58) Field of Classification Search
CPC  B60L 11/1861; B60L 11/1877; B60L 1/003; B60L 2240/70; B60L 2240/80; B60L 2250/20; B60L 2200/42; B60L 2240/622; G07C 5/008; G07C 5/08; B66F 9/075; B66F 9/24; Y02T 10/705; Y02T 10/7291; Y02T 90/16; Y02T 10/7044; Y02T 90/162; Y02T 10/7005
USPC ................................................ 701/32.3, 34.4
See application file for complete search history.

(56) References Cited

U.S. PATENT DOCUMENTS

2012/0109437 A1  5/2012  Iwase et al.

FOREIGN PATENT DOCUMENTS

| EP | 1560143 A2 * | 8/2005 | ............ G07C 5/008 |
|---|---|---|---|
| JP | 63-31999 A | 2/1988 | |

(Continued)

OTHER PUBLICATIONS

International Search Report dated Apr. 16, 2013, issued for PCT/JP2013/054238.

*Primary Examiner* — Brian P Sweeney
(74) *Attorney, Agent, or Firm* — Locke Lord LLP

(57) ABSTRACT

An industrial vehicle includes: a key-on signal detection unit that detects whether or not a key switch is in a key-on state; an under-charging signal detection unit that detects whether or not a storage battery is being charged; an operating time calculation unit that calculates a time, which is in the key-on state and in which charging is not performed, as an operating time; and an output unit that outputs the operating time.

7 Claims, 6 Drawing Sheets

(51) Int. Cl.
   *B66F 9/24*   (2006.01)
   *B60L 1/00*   (2006.01)

(56) References Cited

FOREIGN PATENT DOCUMENTS

| JP | 07-274309 A | 10/1995 |
| JP | 2001-261298 A | 9/2001 |
| JP | 2003 * | 3/2003 | ............... B60S 5/00 |
| JP | 2003-073096 A | 3/2003 |
| JP | 2006-016087 A | 1/2006 |
| JP | 2007-148583 A | 6/2007 |
| JP | 2012-100379 A | 5/2012 |

* cited by examiner

INDUSTRIAL VEHICLE, SYSTEM FOR MANAGING OPERATION OF INDUSTRIAL VEHICLE, AND ELECTRIC FORKLIFT

FIELD

The present invention relates to an industrial vehicle that can highly accurately manage the operating time of the industrial vehicle driven by power charged in a battery, and a system for managing the operation of the industrial vehicle.

BACKGROUND

The operating time of an industrial vehicle such as a forklift is managed so that the planned maintenance can be performed and a prompt action can be performed at the time of the occurrence of a failure. Here, an electric forklift (hereinafter, referred to as a battery forklift) provided with a battery travels by driving a traveling motor using the battery as a drive source, and performs a cargo handling operation by operating a cargo handling device through the driving of a cargo handling motor. Patent Literature 1 discloses an industrial vehicle that can generate the work management data of the daily operation of an industrial vehicle such as a battery forklift.

CITATION LIST

Patent Literature

Patent Literature 1: Japanese Patent Application Laid-open No. 2003-73096

SUMMARY

Technical Problem

The operating time of the battery forklift can be measured by the detection of a signal indicating that a key switch operated to start or stop the battery forklift is in an ON state. The battery forklift does not use an engine and is driven by only power that is charged in the battery. Accordingly, the battery is frequently charged and discharged, and is charged at night that is a time when the battery forklift is not used, or a long time of a holiday. Here, when the battery is charged while the key switch is in an ON state, a signal indicating the ON state is detected. Accordingly, there is a case in which a long charging time is added up to an operating time. If this charging time is added up to an operating time, there is a problem in that an actual operating time in which a cargo handling operation, traveling, or the like is actually performed cannot be accurately obtained.

Meanwhile, the operating time of an engine forklift can be calculated by the detection of a signal that indicates an output voltage of a generator (alternator) driven by the operation of an engine. That is, since the engine forklift does not use a battery as a drive source, the engine forklift does not have to be charged daily. For this reason, it is easy to detect a signal indicating whether or not the engine operates, so that it is possible to obtain an accurate actual operating time. Accordingly, when not only the comparison of the operating times of a plurality of battery forklifts but also the comparison of the operating times of the battery forklift and the engine forklift is performed, a large error in the operating time occurs. For this reason, there is a problem in that an error in the management of an operating time occurs.

The invention has been made in consideration of the above-mentioned problems, and an object of the invention is to provide an industrial vehicle that can highly accurately manage the operating time of the industrial vehicle driven by power charged in a storage battery, a system for managing the operation of the industrial vehicle, and an electric forklift.

Solution to Problem

To overcome the problems and achieve the object, according to the present invention, an industrial vehicle comprises: a key-on signal detection unit that detects whether or not a key switch is in a key-on state; an under-charging signal detection unit that detects whether or not a storage battery is being charged; an operating time calculation unit that calculates a time, which is in the key-on state and in which charging is not performed, as an operating time; and an output unit that outputs the operating time.

According to the present invention, the industrial vehicle further comprises: a display unit that displays various kinds of information, wherein the output unit displays and outputs the operating time on the display unit.

According to the present invention, the output unit outputs at least an operating time and a charging time.

According to the present invention, the operating time calculation unit calculates a value obtained by subtracting a charging time which is a time in which charging is being performed, from a power supply-on time which is a time in the key-on state, as the operating time.

According to the present invention, the industrial vehicle further comprises: a position detector that acquires position information; and a communication unit that transmits the operating time output from the output unit and the position information acquired by the position detector to an outside by radio communication.

According to the present invention, a system for managing an operation of an industrial vehicle, the system comprises: the industrial vehicle; a management server that communicates with the industrial vehicle by radio communication; and a radio communication system in which the industrial vehicle and the management server communicate with each other by radio communication, wherein the output unit outputs the operating time by the radio communication system at a predetermined time.

According to the present invention, an electric forklift comprises: a key-on signal detection unit that detects whether or not a key switch is in a key-on state; an under-charging signal detection unit that detects whether or not a storage battery is being charged; an operating time calculation unit that calculates a time, which is in the key-on state and in which charging is not performed, as an operating time; an output unit that outputs the operating time; a position detector that acquires position information; and a communication unit that transmits the operating time output from the output unit and the position information acquired by the position detector to an outside by radio communication.

According to the invention, the operating time calculation unit calculates a time, which is in the key-on state and in which charging is not performed, as an operating time, and the output unit outputs the operating time. Thus, this enables the industrial vehicle driven by power charged in a storage battery to highly accurately manage the operating time of the industrial vehicle.

DESCRIPTION OF EMBODIMENTS (First Embodiment)

Embodiments of the invention will be described below with reference to the accompanying drawings.

(Entire Structure of Battery Forklift)

Figure 1:
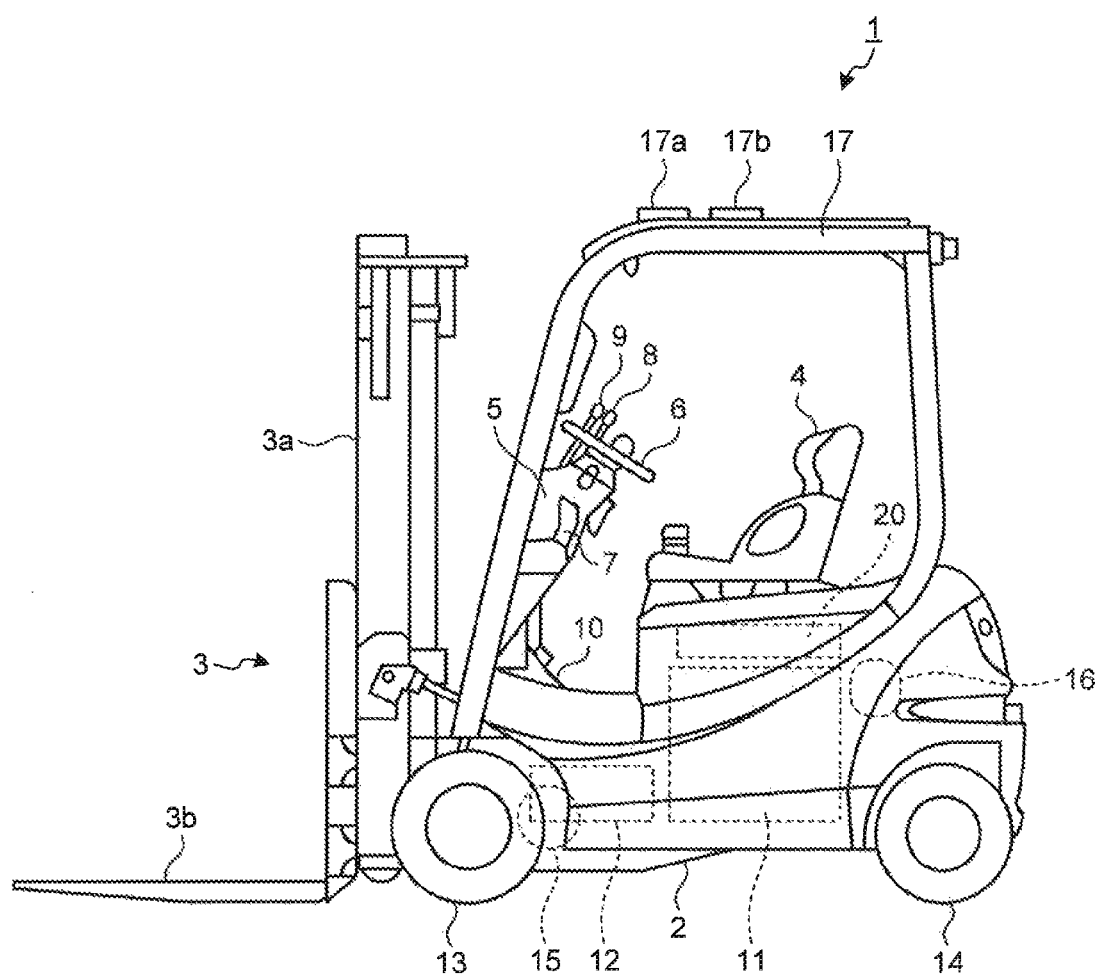
FIG. 1 is a left side view illustrating the entire schematic structure of a battery forklift that is an example of an industrial vehicle according to a first embodiment of the invention.

FIG. 1 is a left side view illustrating the entire schematic structure of an electric forklift (hereinafter, referred to as a battery forklift) that is an example of an industrial vehicle according to a first embodiment of the invention. As illustrated in FIG. 1, a battery forklift 1 includes a cargo handling device 3 at the front portion of a vehicle body 2. The cargo handling device 3 includes a mast 3a and a fork 3b. The fork 3b is guided by the mast 3a and moves up and down. Further, the mast 3a is tilted forward and rearward.

A driver's seat 4 is provided near the middle of the vehicle body 2. A front console 5, a steering wheel 6, a forward/reverse lever 7, a lift lever 8, and a tilt lever 9 are provided on the front side of the driver's seat 4. Further, an accelerator pedal 10 is provided on the lower front side of the driver's seat 4. Furthermore, a brake pedal (not illustrated) is also provided on the lower front side of the driver's seat 4.

A battery 11 is accommodated below the driver's seat 4. The battery 11, which is a storage battery, is a lead storage battery, and includes thirty six 2V-battery cells that are connected in series. Each of the 2V-battery cells is filled with a predetermined amount of electrolyte. Hereinafter, the electrolyte is appropriately referred to as a battery liquid. Meanwhile, the voltage of the battery cell and the number of the battery cells are merely illustrative in this embodiment, and the invention to be described below can be applied without being limited thereto. Each of the 2V-battery cells is filled with the battery liquid. Further, a capacitor 12 is provided at the front portion of the battery 11. Meanwhile, a lead storage battery will be described as an example of the battery in this embodiment, but other secondary batteries may be used. For example, a lithium-ion battery and the like may be used as other secondary batteries.

Drive wheels 13 are provided at the front portion of the vehicle body 2. Further, steered wheels 14 are provided at the rear portion of the vehicle body 2. A traveling motor 15, which is driven by the power of the battery 11 and the capacitor 12, is connected to the drive wheels 13 through a power transmission mechanism (not illustrated). The driving of the traveling motor 15 is controlled according to the operation of the accelerator pedal 10, the forward/reverse lever 7, and the like. Furthermore, the steered wheels 14 are steered according to the operation of the steering wheel 6.

A cargo handling motor 16, which is driven by the power of the battery 11 and the capacitor 12, is provided at the rear portion of the vehicle body 2. The cargo handling motor 16 is connected to a hydraulic pump (not illustrated). The hydraulic pump hydraulically drives a lift cylinder and a tilt cylinder (not illustrated). When the lift lever 8 is operated, the lift cylinder expands and contracts. When the tilt lever 9 is operated, the tilt cylinder expands and contracts. The fork 3b moves up and down and the mast 3a is tilted by the expansion and contraction of the lift cylinder and the tilt cylinder.

Meanwhile, a GPS antenna 17a and a transmission/reception antenna 17b are provided at the upper portion of a cabin 17 that surrounds the driver's seat 4. Further, a controller 20, which controls the entire battery forklift 1, is disposed below the driver's seat 4.

(Outline of System and Electrical Configuration of Battery Forklift)

Figure 2:
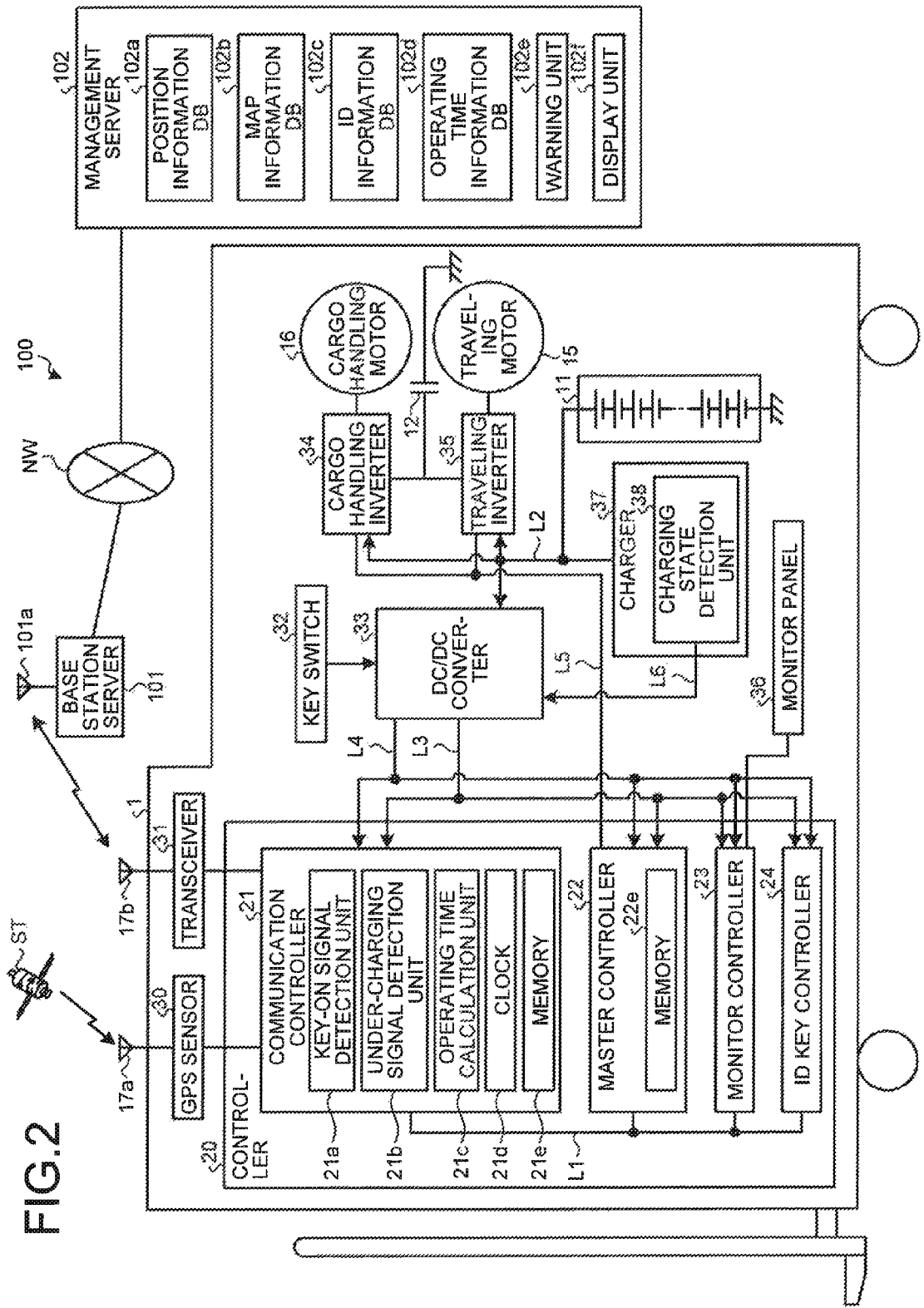
FIG. 2 is a schematic diagram illustrating the entire configuration of a system for managing the operation of the battery forklift according to the first embodiment of the invention and the electrical configuration of the battery forklift.

FIG. 2 is a schematic diagram illustrating the entire configuration of a system 100 for managing the operation of the battery forklift 1 according to the first embodiment of the invention and the electrical configuration of the battery forklift 1. As illustrated in FIG. 2, the system 100 for managing the operation includes at least one or a plurality of battery forklifts 1 to be managed and a management server 102, and the management server 102 is communicatively connected to the battery forklifts 1. Accordingly, the system 100 for managing the operation manages the operating states of the respective battery forklifts 1 by using operating time information that is transmitted from the battery forklifts 1. The battery forklift 1 can detect its own position on the basis of electric waves sent from a plurality of GPS satellites ST. Further, the battery forklift 1 can communicate with a base station server 101 by radio communication. Furthermore, the management server 102 is communicatively connected to the base station server 101 through a network NW. That is, the battery forklift 1 and the management server 102 can communicate with each other using the radio communication system.

The battery forklift 1 includes a GPS sensor 30 and a transceiver 31. The transmission/reception antenna 17b and the transceiver 31 form a communication unit. The GPS sensor 30 is a position detector, receives electric waves sent from the GPS satellites ST through the GPS antenna 17a, detects the position of the battery forklift 1, and generates position information. Meanwhile, since time data are included in the electric waves sent from the GPS satellites ST, a time information generating unit generates time information by using the time data as described below. Further, the transceiver 31 transmits and receives information to and from the base station server 101 through the transmission/reception antenna 17b and a transmission/reception antenna 101a of the base station server 101.

The battery forklift 1 includes the controller 20, a key switch 32, a DC/DC converter 33, a cargo handling inverter 34 that drives the cargo handling motor 16, a traveling inverter 35 that drives the traveling motor 15, a monitor panel 36 that is disposed on the front console 5, a charger 37, the battery 11, and a capacitor 12. Meanwhile, the battery forklift 1 may be adapted so that the charger 37 is not mounted on the battery forklift 1 and the battery 11 can be charged by the charger 37 present outside the vehicle. In this case, the charger 37 present outside the vehicle is not provided with a charging state detection unit 38, and the charging state detection unit 38 may be provided in a connector unit (not illustrated) into which, for example, a charging cable of the battery forklift 1 is inserted. Alternatively, the charger 37 present outside the vehicle may be provided with the charging state detection unit 38, and an under-charging signal may be transmitted to the battery forklift 1 from the charging state detection unit 38.

The controller 20 includes a communication controller 21, a master controller 22, a monitor controller 23, and an ID key controller 24. The communication controller 21, the master controller 22, the monitor controller 23, and the ID key controller 24 are communicatively connected to each other through a communication line L1. The communication line L1 is a communication network that is provided in the vehicle.

A battery, which includes, for example, thirty six 2V-electrode cells (not illustrated) connected in series and outputs a voltage of 74 V, can be used as the battery 11. The battery 11 is connected to the cargo handling inverter 34, the traveling inverter 35, and the DC/DC converter 33 through a power supply line L2, and supplies power to each of the devices. Meanwhile, the charger 37 is connected to the power supply line L2. The DC/DC converter 33 is connected to the communication controller 21, the master controller 22, the monitor controller 23, and the ID key controller 24 through a power supply line L3, and supplies power, which has been converted to a predetermined voltage of, for example, 24 V, to each of the controllers. The key switch 32 is provided at a predetermined position on the front console 5, and a key cylinder, which can start or stop the battery forklift 1 when a key (not illustrated) is inserted into the key switch 32 and is rotated, can be used as the key switch 32. The key switch 32, which is a key cylinder, has three rotational positions, that is, a key-on position, a key-off position, and an accessory position. When the key is rotated to the accessory position from the key-off position, power is supplied to electrical components, such as headlights, (not illustrated) from the battery 11. When the key is further rotated, the key is rotated to the key-on position. Then, when a hand is taken off from the key, the key returns to the accessory position and power from the battery 11 is supplied to the cargo handling motor 16 and the traveling motor 15 through the respective inverters 34 and 35 so that the respective motors 15 and 16 are driven. Accordingly, a cargo handling operation and a traveling operation can be performed. Further, the key switch 32 and the DC/DC converter are electrically connected to each other so that a signal, which is output by the key switch 32 and indicates that the key is positioned at the key-on position or the accessory position, is transmitted to the DC/DC converter 33. When the key switch 32 is in a key-on state, the DC/DC converter 33 sends a key-on signal of, for example, 24 V as a predetermined voltage to the communication controller 21, the master controller 22, the monitor controller 23, and the ID key controller 24 through a control line L4. The master controller 22 is connected to the cargo handling inverter 34 and the traveling inverter 35 through a drive control line L5. The master controller 22 drives the cargo handling motor 16 and the traveling motor 15 by controlling the driving of the cargo handling inverter 34 and the traveling inverter 35 according to the amount of operation of the lift lever 8, the tilt lever 9, the steering wheel 6, the forward/reverse lever 7, and the accelerator pedal 10. Even though the key switch 32 is positioned at the key-off position, the DC/DC converter 33 performs control so that the predetermined voltage (for example, 24 V) is supplied to all of the communication controller 21, the master controller 22, the monitor controller 23, and the ID controller 24 and the respective controllers start when the battery forklift 1 of this embodiment is charged. Meanwhile, the capacitor 12 is connected to the cargo handling inverter 34 and the traveling inverter 35. The capacitor 12 temporarily stores or releases regenerative energy under the control of the cargo handling inverter 34 and the traveling inverter 35. It is possible to particularly improve energy use efficiency by using the capacitor 12.

The charger 37 converts AC power, which is supplied from an external power supply for charging, into DC power and charges the battery 11 through the power supply line L2. A commercial power supply of three-phase AC 200V, which is installed in a factory or a warehouse in which the battery forklift 1 is operated, can be used as the external power supply for charging. The charger 37 includes the charging state detection unit 38 to which the external power supply for charging is connected and which detects whether or not the battery is being charged. A unit, which is formed of, for example, a contact switch and of which the contact switch operates and outputs a predetermined signal when a plug of a charging cable (not illustrated) of the commercial power supply is inserted into the charger 37, can be used as the charging state detection unit 38. That is, when the battery is being charged, the charging state detection unit 38 outputs a predetermined signal (under-charging signal). The under-charging signal is output to the DC/DC converter 33 through a charging detection line L6 that connects the charging state detection unit 38 to the DC/DC converter 33. The charging state detection unit 38 may be a unit using a semiconductor device, which outputs a predetermined signal by power supplied from a commercial power supply when a plug (not illustrated) is inserted into the charger 37, instead of the contact switch.

The communication controller 21 includes a key-on signal detection unit 21a, an under-charging signal detection unit 21b, an operating time calculation unit 21c, a clock 21d that forms a time information generating unit, and a memory 21e. The clock 21d is formed of, for example, a clock IC, and always generates information indicating a time. Further, time data are included in the electric waves that are sent from the GPS satellites ST, and the communication controller 21 receives the time data through the GPS antenna 17a and the GPS sensor 30. Furthermore, the time measured by the clock IC and the received time data are compared with each other and the current time is corrected by a time correction program (not illustrated) that is stored in the memory 21e of the communication controller 21. The time correction program forms the time information generating unit, and may be stored in a memory unit that is present in the communication controller 21 and different from the memory 21e. The correction of the current time, which uses the time data received from the GPS satellites ST, is performed at a predetermined interval that is set in the time correction program. Hereinafter, the current time that has been subjected to correction is referred to as time information. Meanwhile, the current time, which is obtained by the clock IC, may be used as the time information as it is without correction. That is, any one of the current time that has been subjected to correction using the electric waves sent from the GPS satellites ST and the current time that is obtained from the clock IC may be used as the time information. The key-on signal detection unit 21a detects whether or not a key-on signal is input from the control line L4. The under-charging signal detection unit 21b detects whether or not an under-charging signal is input through the charging detection line L6. The operating time calculation unit 21c can calculate an operating time by the calculation processing of an operating time to be described below. When a key-on signal is input and an under-charging signal is not input, the operating time calculation unit 21c determines that the battery forklift 1 is operating and cumulatively adds an operating time. The cumulatively added operating time is stored in the memory 21e and is updated.

Further, the communication controller 21 acquires position information from the GPS sensor 30. Furthermore, the communication controller 21 also can acquire the operating state of the battery forklift 1 through the master controller 22 or the monitor controller 23 regularly or in response to an instruction from the management server 102. Moreover, the communication controller transmits moving-body information, which includes an operating state, position information, time information, and a vehicle ID, to the management server 102 through the transceiver 31. The operating time, which is stored in the memory 21e, is included in the operating state. The time information generating unit generates time information that indicates the current time as described above, so that the time information can be acquired. The communication controller 21 includes an output unit (not illustrated), and the output unit outputs moving-body information, such as an operating state including an operating time, to the transceiver 31.

The master controller 22 includes a memory 22e and an operation control unit (not illustrated) that controls the cargo handling inverter 34 or the traveling inverter 35. The memory 22e stores various kinds of information, such as a control program necessary for the operation of the operation control unit of the master controller 22. When receiving an under-charging signal from the charging state detection unit 38, the master controller 22 starts and transmits a start signal to the communication controller 21, the monitor controller 22, and the ID key controller 24 through the communication line L1 to make each of the controllers start.

The monitor controller 23 is connected to the monitor panel 36. The monitor panel 36 is a display unit of the battery forklift 1; is a panel including an LCD monitor and predetermined switches, a touch panel, or the like; and can input, display, and output various kinds of information. Meanwhile, the monitor panel 36 may include only an LCD monitor, and may be adapted so that various kinds of information can be input to the monitor panel 36 by separate switches or the like. The monitor panel 36 displays various kinds of information to an operator. That is, when the battery forklift 1 performs the cargo handling operation or the traveling operation, the monitor panel 36 can display the amount of charge of the battery 11 by a bar graph, display traveling speed, or display situations in which various errors occur. Further, when the battery forklift 1 is being charged, the monitor panel 36 shows a graphic display, which indicates the progress of charging, thereon. A bar graph display or a display that visually displays the amount of charge by using the design of a battery may be used as the graphic display. When the design of a battery is used, the amount of charge can be represented by the size of the filled area in the design of a battery. The ID key controller 24 manages the IDs of operators. For example, when communication is requested from the management server 102, operator ID information stored in the ID key controller 24 is transmitted to the management server 102 through the communication controller 21. Alternatively, when a key is inserted into the key switch 32 or when a special operation of the monitor panel 36 is performed, authentication processing of an operator ID is performed to determine whether or not the operator is a person permitted to operate the battery forklift 1. An ID key in which an electronic chip storing an ID is embedded can be used as the key. When the ID key controller 24 authenticates that the operator ID is an authorized ID, the ID key controller 24 transmits a signal, which indicates the result of the authentication, to the master controller 22 through the communication line L1. As a result, the master controller 22 outputs a control signal, which allows a traveling operation or a cargo handling operation, to the DC/DC converter 33, the cargo handling inverter 34, or the traveling inverter 35. Meanwhile, the ID key controller 24 is not an essential component in this embodiment.

The management server 102 includes a position information database (DB) 102a, a map information database (DB) 102b, an ID information database (DB) 102c, an operating time information database (DB) 102d, a warning unit 102e, and a display unit 102f. The position information DB 102a stores the position information of the battery forklifts 1 that is transmitted from the battery forklifts 1. The map information DB 102b stores map information that is necessary for the display unit 102f to display a place where each battery forklift 1 operates. The ID information DB 102c stores operator ID information. The ID information DB 102c may store vehicle ID information that is used to individually identify the respective battery forklifts 1. The operating time information DB 102d stores information about the operating time. The warning unit 102e receives failure information, which is included in the moving-body information, from the battery forklift 1, sets warning levels depending on the content of the failure information, and outputs warning according to the warning levels. The output destination of the warning may be the display unit 102f of the management server 102 or a user terminal (not illustrated) that is connected to the management server 102. Information, which indicates the warning, may be transmitted to the battery forklift 1 by radio communication and may be output by a display unit (not illustrated) of the monitor panel 36 or a sounder using a speaker (not illustrated) that is provided in the battery forklift 1. Meanwhile, the display unit 102f includes a display unit such as a liquid crystal panel.

(Calculation/Transmission Processing of Operating Time)

Figure 3:
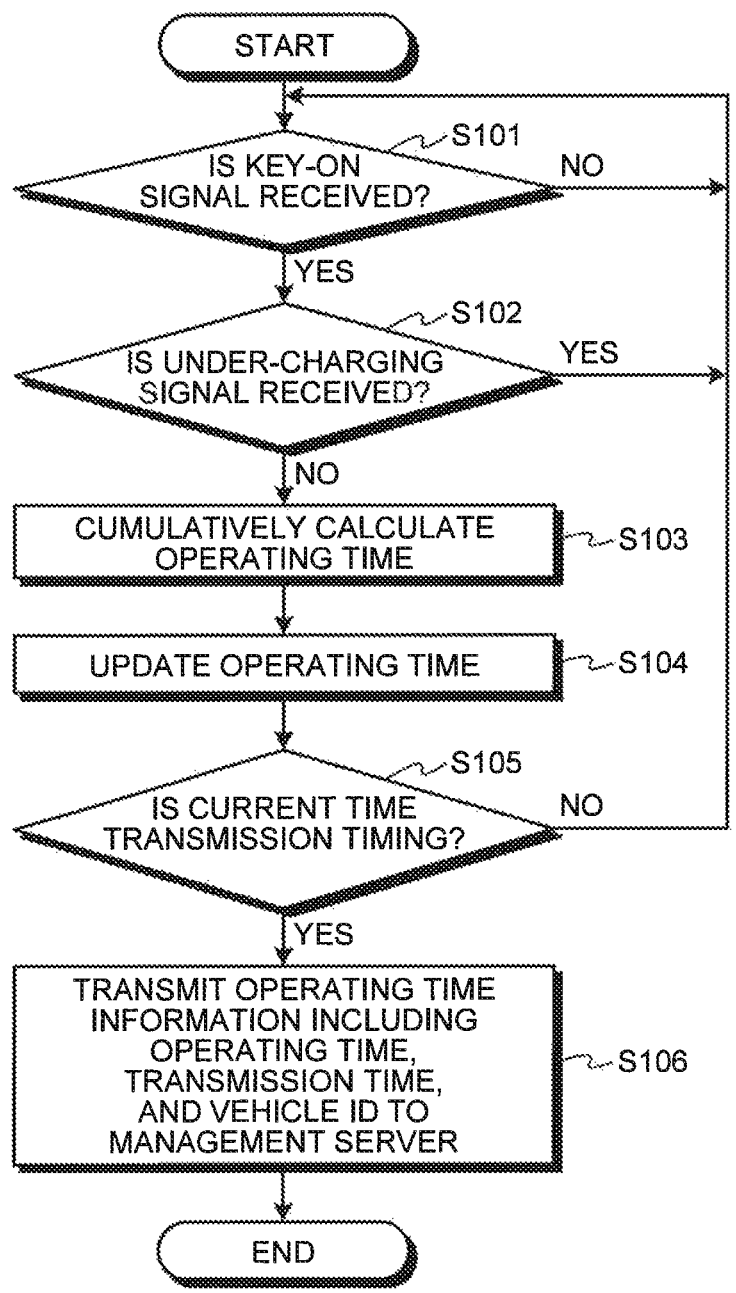
FIG. 3 is a flowchart illustrating the procedure of the calculation/transmission processing of an operating time that is performed by a communication controller.

Next, the procedure of the calculation/transmission processing of an operating time, which is performed by the communication controller 21, will be described with reference to flowchart illustrated in FIG. 3. Meanwhile, a program, which executes the procedure of the calculation/transmission processing of an operating time, is stored in the memory 21e of the communication controller 21. As illustrated in FIG. 3, the key-on signal detection unit 21a determines whether or not a key-on signal input through the control line L4 is received, at a predetermined sampling time (Step S101). For example, a time of 1 second is set in advance as the predetermined sampling time. A signal indicating that the key is positioned at the accessory position when the key switch 32 is positioned at the accessory position, that is, a signal indicating a voltage of, for example, 24 V is output to the DC/DC converter 33 from the key switch 32, and the signal is transmitted to the communication controller 21 through the control line L4, so that the key-on signal detection unit 21a can determine whether or not the key-on signal is received. If the key-on signal is not received (No in Step S101), this determination processing is repeated.

If the key-on signal is received (Yes in Step S101), the under-charging signal detection unit 21b further determines whether or not an under-charging signal is received through the charging detection line L6 and the DC/DC converter 33 (Step S102). If the under-charging signal is received (Yes in Step S102), the processing proceeds to Step S101.

If the under-charging signal is not received (No in Step S102), it is a power supply-on time where charging is not performed. Accordingly, when the key-on signal is received at the predetermined sampling time, cumulative calculation for adding a time corresponding to the sampling time, for example, 1 second is performed at the operating time stored in the memory 21e (Step S103). Meanwhile, the processing of Steps S101 to S103 may be the following processing. The number of times of reception of the key-on signal is counted in the sampling within a predetermined time (for example, 10 seconds), and cumulative calculation for adding a time, which is obtained by multiplying the counted number by the predetermined sampling time (for example, 1 second), to the operating time stored in the memory 21e may be performed. Then, the operating time stored in the memory 21e is updated (Step S104).

After that, it is determined whether or not the current time is a transmission timing (Step S105). The transmission timing may be set to a regular time, such as a daily fixed time or a monthly fixed time, or an irregular time such as a time when transmission is requested from the management server 102. When the transmission timing is a daily fixed time or a monthly fixed time, these timings are stored in a memory unit (not illustrated) or the memory 21e of the communication controller 21 in advance. Further, when these timings are to be changed, these timings can be changed by a change command sent from the management server 102. If the current time generated by the time information generating unit is the transmission timing (Yes in Step S105), operating time information, which includes an operating time, time information indicating the transmission time measured by the time information generating unit, and a vehicle ID, is transmitted to the management server 102 (Step S106). Meanwhile, if the current time is not the transmission timing (No in Step S105), the processing proceeds to Step S101. Operator IDs, which are authenticated by the ID key controller 24, may be included in the operating time information.

Meanwhile, the description has been made on the premise that the operating time updated by the communication controller 21 is a cumulative time. In this case, the operating time transmitted by the communication controller 21 may be a difference time between the time of previous transmission and the time of the current transmission, and may be a cumulative time. It is preferable that a difference time be used in the case of the transmission of a daily fixed time and a cumulative time be used in the case of the transmission of a monthly fixed time. The operating time has the length of a time which is in a key-on state and in which charging is not performed. That is, the operating time is a time excluding the time in which the battery 11 is being charged. Further, naturally, a time in which the traveling operation, the cargo handling operation, or the like is not performed and charging is also not performed is not included in the operating time.

(Second Embodiment: Modification of Calculation/Transmission Processing of Operating Time)

In the above-mentioned embodiment, when a key-on signal is received and an under-charging signal is not received, it is determined that the battery forklift is operating and an operating time is directly and cumulatively added. Without being limited thereto, in this second embodiment, a power supply-on time in which a key-on signal is received and a charging time in which an under-charging signal is received are cumulatively added, and a time, which is obtained by subtracting the charging time from the power supply-on time, is indirectly calculated as an operating time. In this case, i is possible to directly obtain the charging time besides the operating time.

Figure 4:
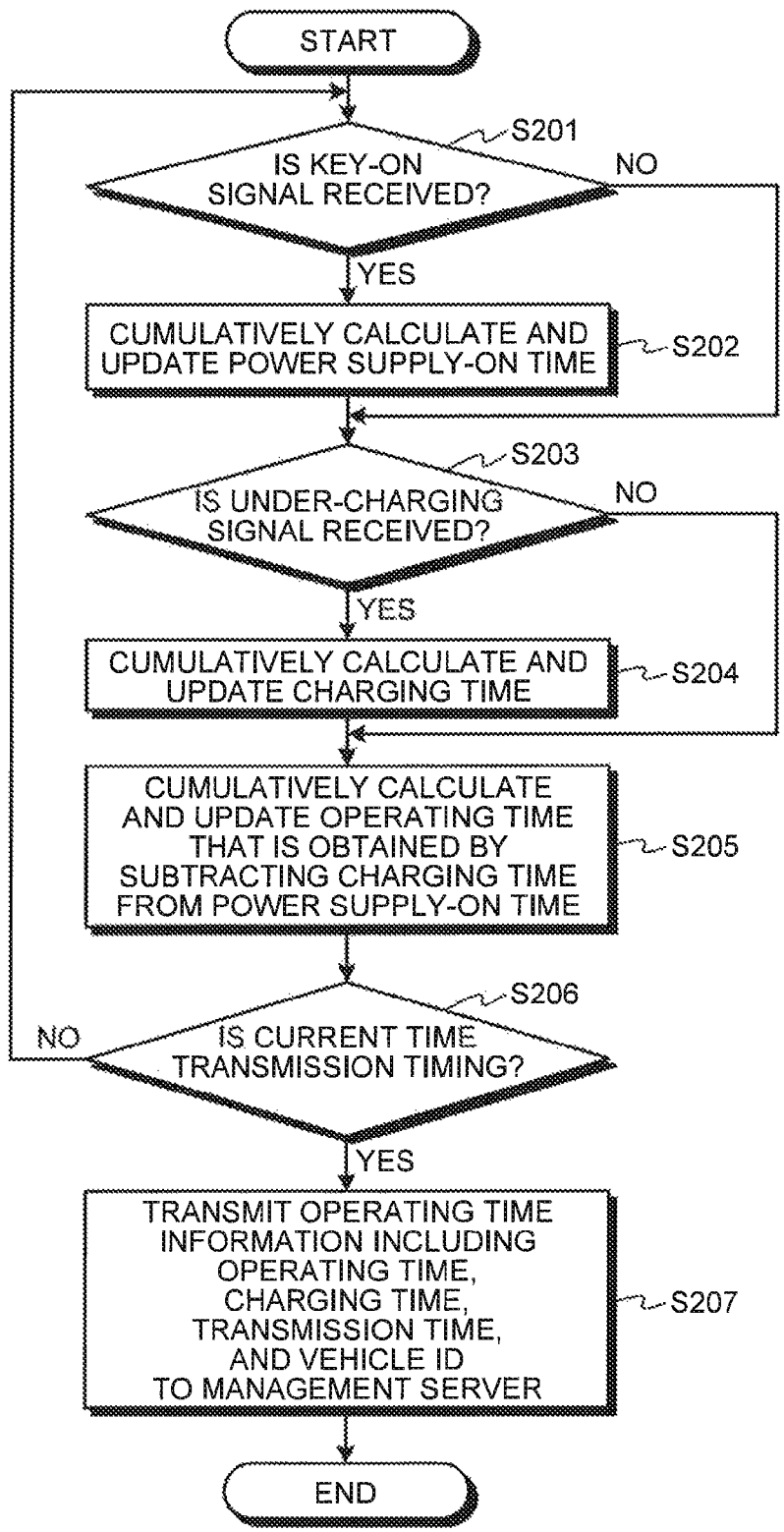
FIG. 4 is a flowchart illustrating the procedure of the calculation/transmission processing of an operating time that is performed by a communication controller according to a second embodiment of the invention.

FIG. 4 is a flowchart illustrating the procedure of the calculation/transmission processing of an operating time that is performed by the communication controller 21 according to the second embodiment of the invention. As illustrated in FIG. 4, the key-on signal detection unit 21a determines whether or not a key-on signal input through the control line L4 is received, at the same predetermined sampling time as the first embodiment (Step S201). If the key-on signal is not received (No in Step S201), the processing proceeds to Step S203. If the key-on signal is received (Yes in Step S201), this predetermined sampling time is cumulatively added as a power supply-on time and the power supply-on time is updated (Step S202).

After that, the under-charging signal detection unit 21b determines whether or not an under-charging signal is received through the charging detection line L6 and the DC/DC converter 33 at the same predetermined sampling time as the first embodiment (Step S203). If the under-charging signal is not received No in Step S203), the processing proceeds to Step S205. Meanwhile, if the under-charging signal is received (Yes in Step S203), charging is being performed. Accordingly, this predetermined sampling time is cumulatively added as a charging time and the charging time is updated (Step S204).

After that, in Step S205, an operating time, which is obtained by subtracting the charging time from the power supply-on time stored in a memory 21e, is cumulatively calculated and is updated (Step S205).

Then, it is determined whether or not the current time is a transmission timing (Step S206). As in the first embodiment, the transmission timing may be set to a regular time, such as a daily fixed time or a monthly fixed time, or an irregular time such as a time when transmission is requested from the management server 102. If the current time generated by a time information generating unit is the transmission timing (Yes in Step S206), operating time information, which includes an operating time, a charging time, time information indicating the transmission time measured by the time information generating unit, and a vehicle ID is, transmitted to the management server 102 (Step S207). Meanwhile, if the current time is not the transmission timing (No in Step S105), the processing proceeds to Step S201. Operator IDs, which are authenticated by the ID key controller 24, may be included in the operating time information.

(Third Embodiment: Modification of Calculation Processing of Operating Time Performed by Master Controller)

Figure 5:
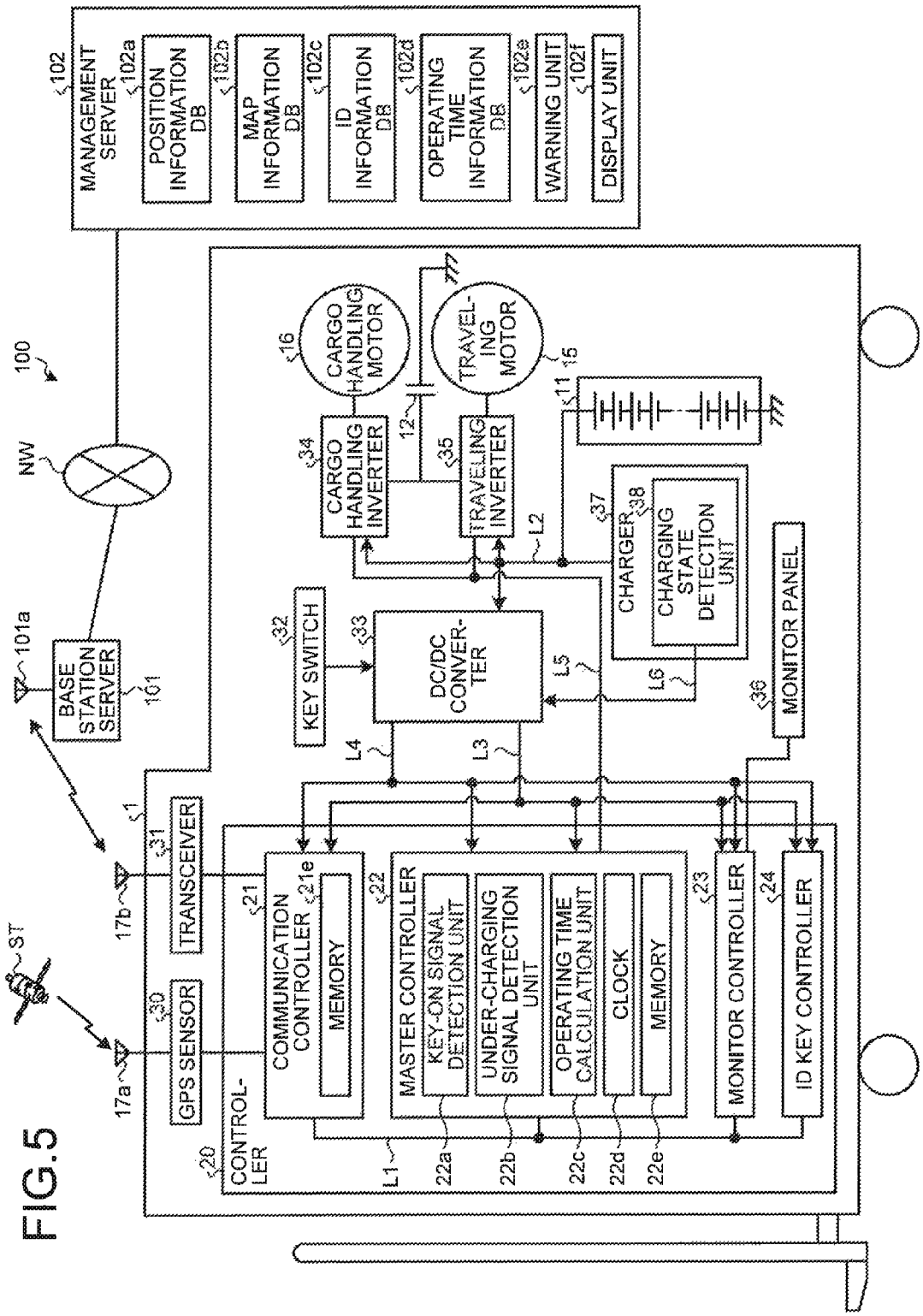
FIG. 5 is a schematic diagram illustrating the entire configuration of a system for managing the operation of a battery forklift according to a third embodiment of the invention and the electrical configuration of the battery forklift.

This third embodiment is adapted so that the master controller 22 performs the calculation processing of an operating time instead of the communication controller 21. FIG. 5 is a schematic diagram illustrating the entire configuration of a system 100 for managing the operation of a battery forklift 1 according to a third embodiment of the invention and the electrical configuration of the battery forklift 1. As illustrated in FIG. 5, the key-on signal detection unit 21a, the under-charging signal detection unit 21b, the operating time calculation unit 21c, and the clock 21d, which are disposed in the communication controller 21 of the first and second embodiments, are disposed in the master controller 22 as a key-on signal detection unit 22a, an under-charging signal detection unit 22b, an operating time calculation unit 22c, and a clock 22d.

In this third embodiment, the master controller 22 calculates an operating time and the communication controller 21 transmits operating time information to the management server 102. That is, the calculation processing of an operating time and the transmission processing of an operating time are separated from each other. Further, the master controller 22 includes an output unit (not illustrated), and the output unit outputs moving-body information, such as an operating state including an operating time, to the communication controller 21 or the monitor controller 23. Accordingly, moving-body information can be output to the outside through the transceiver 31, which is a communication unit, using radio communication, or moving-body information, for example, an operating time can be displayed and output on the monitor panel 36.

(Management Processing of Management Server)

Figure 6:
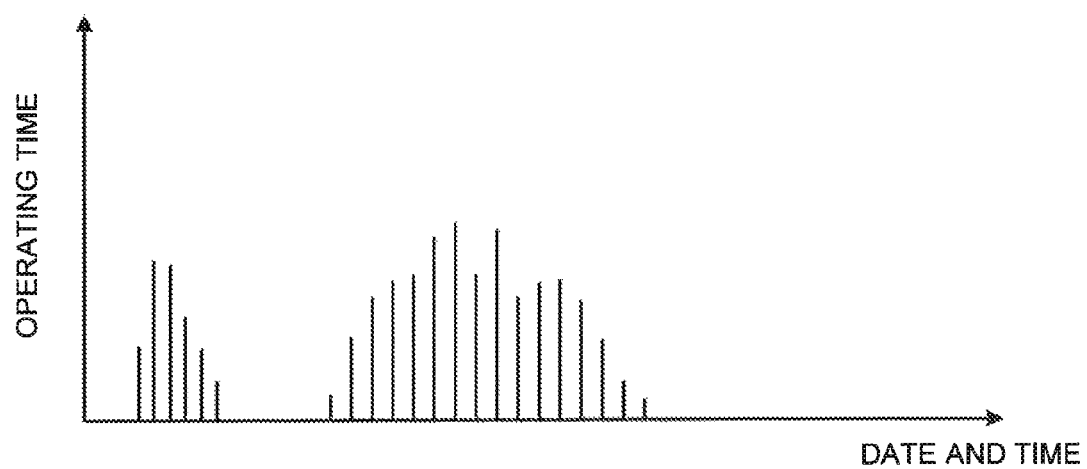
FIG. 6 is a diagram illustrating an example of the history management of an operating time that is performed by a management server.

Since the management server 102 can obtain operating time information including the above-mentioned highly accurate operating time, the management server 102 can accurately manage the operating time of the battery forklift 1. Further, it is possible to accurately compare the operating times of an engine forklift and a battery forklift. Here, since the management server 102 can obtain operating time information indicating a highly accurate operating time and time information indicating a transmission time, the management server 102 can manage the history of an operating time as illustrated in FIG. 6. When, for example, a week or a month is used as a unit of the date and time of a horizontal axis of FIG. 6, it is possible to remotely manage which day of the week the battery forklift 1 operates much or which day of the month the battery forklift 1 operates much. Alternatively, when a day is used as a unit of the date and time of the horizontal axis of FIG. 6, it is possible to remotely manage which time zone of the day the battery forklift 1 operates much. Since position information is also transmitted from the battery forklift 1, it is also possible to easily manage the operating time of the battery forklift 1 that operates in a certain place. Since the history of an operating time is managed and analyzed in this way, a period in which an operating time is long or a period in which an operating time is short is actualized. Since a place in which the battery forklift 1 to which operating time information is linked operates is known, it is possible to manage the operation of the battery forklift in more details. Therefore, it is possible to efficiently check a plan for the maintenance of each battery forklift 1 depending on the length of an operating time, a plan for the operation of the battery forklift 1, and the like.

Further, since the management server 102 can obtain vehicle IDs, the management server 102 can easily manage the operating time of each of the battery forklifts even though a plurality of same vehicles are present in the same region. That is, a person who manages a plurality of battery forklifts 1 operating in, for example, a specific warehouse or the like can check the plan for the operation of the battery forklifts 1 by using the system 100 for managing the operation. Meanwhile, the vehicle IDs may correspond to the unique serial numbers of the respective forklifts 1, and may be the serial number or the like of the communication controller 21. That is, the vehicle IDs only have to individually identify the respective forklifts.

Furthermore, the communication controller 21 and the master controller 22 have been formed as separate controllers in the above-mentioned embodiments, but the communication controller may be provided in the master controller 22.

Further, various kinds of information may be transmitted to the management server 102 as information about an operating state other than an operating time or a charging time. For example, whenever charging is performed, information indicating the charging time and charged energy of the battery 11 is obtained by a sensor or the like provided in the battery forklift 1 and these kinds of information may be transmitted to the management server 102 together.

Furthermore, the above-mentioned embodiments have been based on the premise that an operating time and the like are transmitted to the management server 102, but the invention is not limited thereto. Radio communication may not be used, the master controller 22 may be provided with an output unit (not illustrated), and information indicating an operating time may be output to the monitor controller 23 from the output unit so that an operating time is displayed and output on the monitor panel 36 of the battery forklift 1. In this case, an operating time, which is calculated by the communication controller 21 or the master controller 22, can be displayed and output as a service meter.

Further, the description has been made in the above-mentioned embodiments on the premise that the battery 11 and the capacitor 12 are used, but the invention is also applied to a battery forklift that is driven by only the battery without the capacitor 12. Furthermore, the battery forklift 1 is an example of an industrial vehicle as described above and this embodiment generally can be applied to an industrial vehicle. For example, this embodiment is also applied to an electric construction machine that is not provided with an engine and is adapted to drive an electric motor by using a battery as a power source, to drive a hydraulic pump by the electric motor, and to supply a working fluid to a hydraulic cylinder of a working machine to operate the working machine.

REFERENCE SIGNS LIST

1 BATTERY FORKLIFT
2 VEHICLE BODY
3b FORK
3a MAST
3 CARGO HANDLING DEVICE
4 DRIVER'S SEAT
5 FRONT CONSOLE
6 STEERING WHEEL
7 FORWARD/REVERSE LEVER
8 LIFT LEVER
9 TILT LEVER
10 ACCELERATOR PEDAL
11 BATTERY
12 CAPACITOR
13 DRIVE WHEEL
14 STEERED WHEEL
15 TRAVELING MOTOR
16 CARGO HANDLING MOTOR
17 CABIN
17a GPS ANTENNA
17b TRANSMISSION/RECEPTION ANTENNA
20 CONTROLLER
21 COMMUNICATION CONTROLLER
21a, 22a KEY-ON SIGNAL DETECTION UNIT
21b, 22b UNDER-CHARGING SIGNAL DETECTION UNIT
21c, 22c OPERATING TIME CALCULATION UNIT 21d, 22d CLOCK
21e, 22e MEMORY
22 MASTER CONTROLLER
23 MONITOR CONTROLLER
24 ID KEY CONTROLLER
30 GPS SENSOR
31 TRANSCEIVER
32 KEY SWITCH
33 DC/DC CONVERTER
34 CARGO HANDLING INVERTER.
35 TRAVELING INVERTER
36 MONITOR PANEL
37 CHARGER
38 CHARGING STATE DETECTION UNIT
100 SYSTEM FOR MANAGING OPERATION
101 BASE STATION SERVER
101a TRANSMISSION/RECEPTION ANTENNA
102 MANAGEMENT SERVER
102a POSITION INFORMATION DATABASE
102b MAP INFORMATION DATABASE
102c ID INFORMATION DATABASE
102d OPERATING TIME INFORMATION DATABASE
102e WARNING UNIT
102f DISPLAY UNIT
L1 COMMUNICATION LINE
L2 POWER SUPPLY LINE
L3 POWER SUPPLY LINE
L4 CONTROL LINE
L5 DRIVE CONTROL LINE
L6 CHARGING DETECTION LINE
NW NETWORK
ST GPS SATELLITE

The invention claimed is:

1. An industrial vehicle comprising:
a key-on signal detection unit that detects a first signal representing whether or not a key switch is in a key-on state;
an under-charging signal detection unit that detects a second signal representing whether or not a storage battery is being charged;
an operating time calculation unit that calculates an operation time of the industrial vehicle, in which charging is not performed, during the key-on state, based on both of the first signal and the second signal;
a display unit that displays various kinds of information; and
an output unit that displays and outputs the operating time on the display unit.

2. The industrial vehicle according to claim 1,
wherein the output unit outputs at least the operating time and a charging time.

3. The industrial vehicle according to claim 1,
wherein the operating time calculation unit calculates the operating time obtained by subtracting a charging time which is a time in which charging is being performed, from a power supply-on time which is a time in the key-on state.

4. The industrial vehicle according to claim 1, further comprising:
a position detector that acquires position information; and
a communication unit that transmits the operating time output from the output unit and the position information acquired by the position detector to an external device by radio communication.

5. A system for managing an operation of an industrial vehicle, the system comprising:
an industrial vehicle , wherein the industrial vehicle including:
a key-on signal detection unit that detects a first signal representing whether or not a key switch is in a key-on state;
an under-charging signal detection unit that detects a second signal representing whether or not a storage battery is being charged;
an operating time calculation unit that calculates an operation time of the industrial vehicle, in which charging is not performed during the key-on state based on both of the first signal and the second signal;
a display unit that displays various kinds of information;
an output unit that displays and outputs the operating time on the display unit; and
an output unit that outputs the operating time, wherein the system further comprising:
a management server that communicates with the industrial vehicle by radio communication; and
a radio communication system in which the industrial vehicle and the management server communicate with each other by radio communication,
wherein the output unit outputs the operating time by the radio communication system at a predetermined time.

6. An electric forklift comprising:
a key-on signal detection unit that detects a first signal representing whether or not a key switch is in a key-on state;
an under-charging signal detection unit that detects a second signal representing whether or not a storage battery is being charged;
an operating time calculation unit that calculates an operation time of the industrial vehicle, in which charging is not performed during the key-on state, based on both of the first signal and the second signal;
a display unit that displays various kinds of information;
an output unit that displays and outputs the operating time on the display unit;
a position detector that acquires position information; and
a communication unit that transmits the operating time output from the output unit and the position information acquired by the position detector to an external device by radio communication.

7. A method for calculating the operating time of an industrial vehicle comprising:
detecting a first signal representing whether or not a key switch is in a key-on state with a key-on signal detection unit;
detecting a second signal representing whether or not a storage battery is being charged with an under-charging signal detection unit;
acquiring position information with a position detector;
calculating an operating time of the industrial vehicle, in which charging is not performed during the key-on state, based on both of the first signal and the second signal;
displaying various kinds of information on a display unit;
displaying and outputting the operating time on the display unit with an output unit; and
transmitting the operating time and the position information acquired by the position detector to an external device by radio communication.

* * * * *